May 20, 1930.　　　　M. A. CHARLOT　　　　1,759,732
COOKING POT OF THE SELF CLOSING TYPE FOR
THE COOKING OF FOOD AND FOR OTHER USES
Filed Oct. 8, 1927　　　3 Sheets-Sheet 1

INVENTOR
Moise A. Charlot
BY
ATTORNEY

May 20, 1930. M. A. CHARLOT 1,759,732
COOKING POT OF THE SELF CLOSING TYPE FOR
THE COOKING OF FOOD AND FOR OTHER USES
Filed Oct. 8, 1927 3 Sheets-Sheet 2

INVENTOR
Moise A. Charlot
BY
ATTORNEY

May 20, 1930.  M. A. CHARLOT  1,759,732
COOKING POT OF THE SELF CLOSING TYPE FOR
THE COOKING OF FOOD AND FOR OTHER USES
Filed Oct. 8, 1927   3 Sheets-Sheet 3
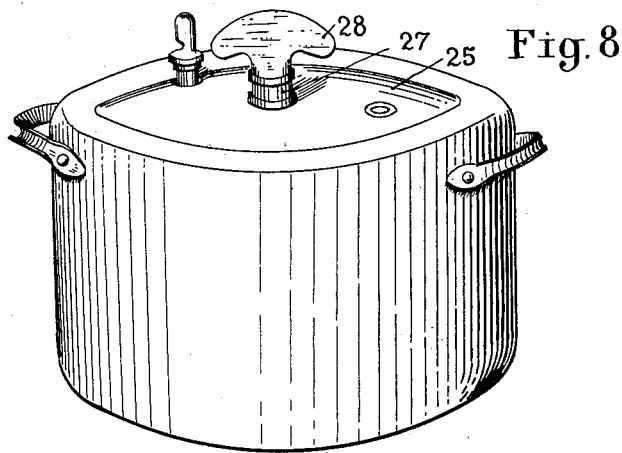
Fig. 8
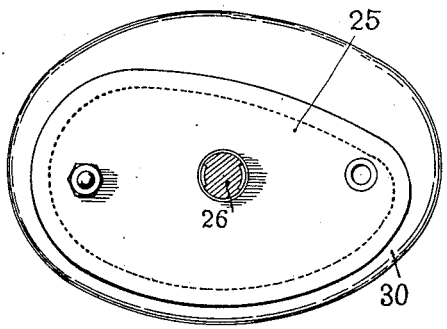
Fig. 9
Fig. 10
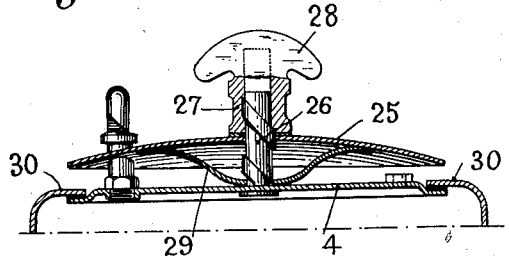
Fig. 11
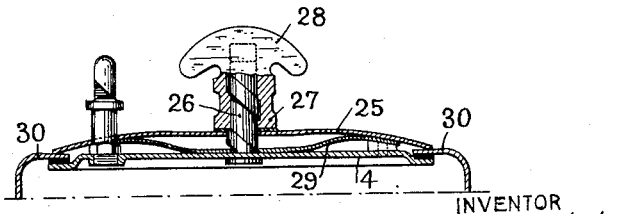
INVENTOR
Moise A. Charlot
BY
ATTORNEY Patented May 20, 1930

1,759,732

UNITED STATES PATENT OFFICE

MOÏSE ALI CHARLOT, OF PARIS, FRANCE

COOKING POT OF THE SELF-CLOSING TYPE FOR THE COOKING OF FOOD AND FOR OTHER USES

Application filed October 8, 1927, Serial No. 224,861, and in France October 30, 1926.

The present invention relates to a cooking pot of the self-closing type for the cooking of food and for other uses.

It has already been proposed, in order to reduce the consumption of fuel for cooking food, to place the food in tightly closed vessels, so that the cooking will take place at a pressure appropriate to the nature of the food substances, thus furthering the disaggregation or the transformation of the cells of the substances employed, but the devices in current use for this purpose cannot be conveniently handled, in order to provide for the insertion and removal of the cover without contaminating the food, a considerable empty space must be provided above the food in the vessel, so that the size of the cooking vessel is much in excess of what is essentially required.

In the improved cooking vessel according to the present invention all such defects will be obviated. The apparatus comprises a main body which has preferably an oval or elliptical form in horizontal section; the upper face is pierced with an aperture which has preferably an unsymmetrical form and is placed in the unsymmetrical position with reference to the axes of symmetry of the said upper face, whereby the said cover may be inserted and removed by a simple movement of sliding and rotation in the horizontal direction, thus preventing all contamination of the food and affording a better utilization of the volume of the receptacle.

On the cover of the vessel is mounted an eccentric disc in contact with a suitable supporting bar which rests at its ends upon the opposite edges of the vessel, the position of this element being suitably limited by stops, whereby the cover may be placed in position without any improper movements, and will not be allowed to fall during the operations.

The self-closing cover is preferably combined with a suitably supporting plate which is optionally curved and has a suitable size, and is adapted to fit upon the outer periphery of the aperture to be closed, with the optional interposition of a packing member, said cover being provided with one or more rods, preferably in the central position; upon each rod is mounted, at the outside of the plate, a fastening nut which is preferably formed in one with an operating handle, and a spring or like elastic member is placed between the cover and the said supporting plate so that the device can be more readily placed in position, also reducing the general size of the cover and assuring a tight fit of the parts.

The appended drawings show by way of example various embodiments of the invention, relative to a pot for cooking food.

Fig. 1 is a perspective view of the cooking pot and

Fig. 2 a plan view,

Figure 5:
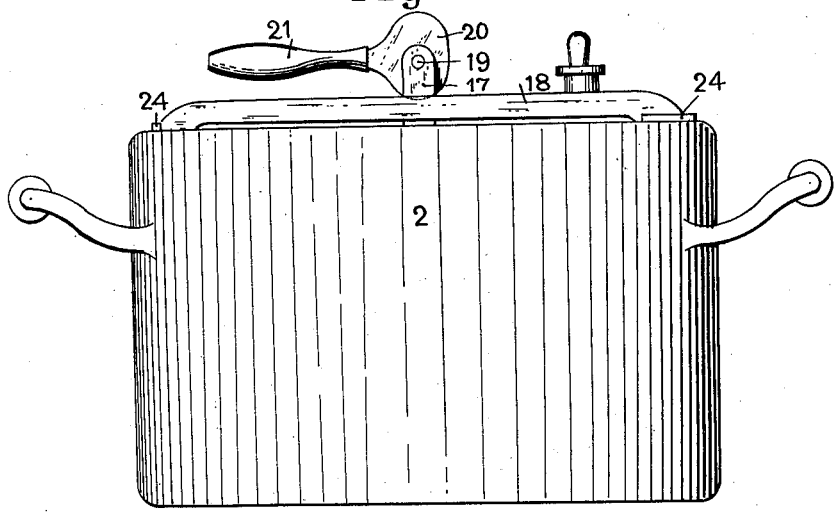
Figure 6:
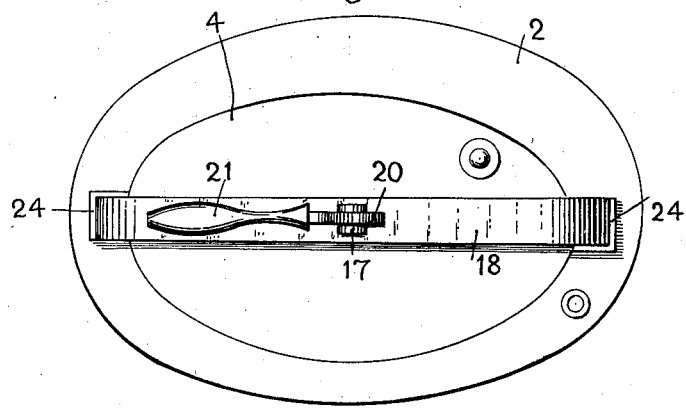
Figure 7:
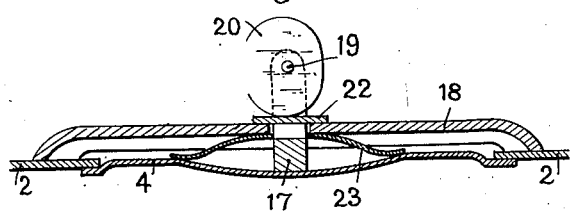

Fig. 5 is a general elevational view of the apparatus, showing a modified form of closing device, and Fig. 6 is the corresponding plan view, Fig. 7 is a vertical cross section of Fig. 6, Fig. 8 is a perspective view of another construction of the pot, in the closed position, and Fig. 9 is the corresponding plan view, Figs. 10 and 11 are vertical sections, respectively before and after the cover is placed in the closed position according to Fig. 8.

The said cooking pot comprises a main body 1 whose cross-section has preferably an elliptical form, and which is provided with a flat bottom and is covered at the top by a flat member 2, the joints between the said upper and lower parts and the main body 1 being preferably rounded, the device consisting of the main body with its top and bottom parts being formed in any suitable manner, for instance by the pressing process, or it may consist of parts connected together by autogenous welding or the like.

Figure 1:
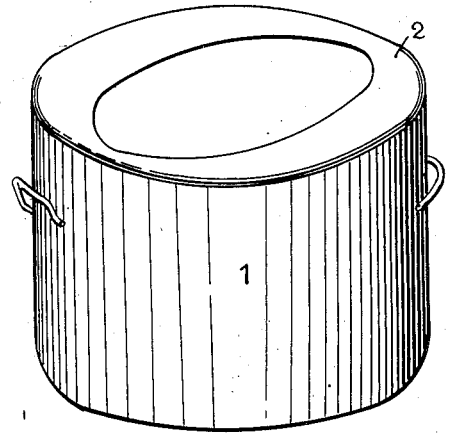
Figure 2:
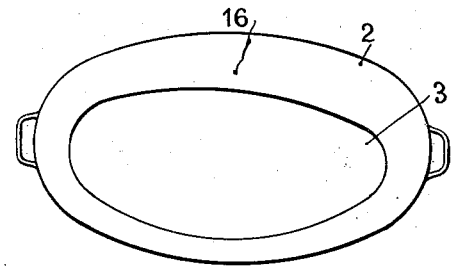
Figure 3:
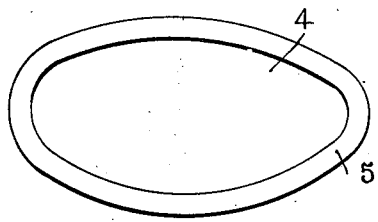
Fig. 3 is a diagrammatic view of the cover.

The top part 2 which has an oval or elliptical shape is represented chiefly in Fig. 2; it is pierced with an aperture 3, preferably of an irregular form, such as an egg shape, whose disposition with reference to the upper face 2 may be unsymmetrical as shown in Fig. 2. The cover 4 has the shape corresponding to that of the aperture 3 and comprises an edge portion co-operating with the lower part of the edge of the aperture 3.

To the upper face of the cover 4 is suitably attached the strap 6 to which is secured the pivot axle 7 of a handle 8 comprising at the bottom a projection 9 engaging between the teeth 10—suitably spaced—which are formed in the upper part of a closing bar 11. At the ends of said bar are formed the inclined surfaces 12—13 coacting with the contact surfaces 14—15 formed upon the upper member 2 of the main body 1.

The said device is completed by the use of all necessary parts such as an indicating element (whistle, pressure gauge or the like) a safety valve, a fusible plug, or like accessories.

The said pot according to the invention is utilized for the cooking of food in the following manner.

The food is placed in the vessel, and the cover is put on, this being slid horizontally, or in a slightly inclined position, into the aperture 3 so as to place the major part of the cover under the widest edge 16 (Fig.2) of the top 2.

Figure 4:
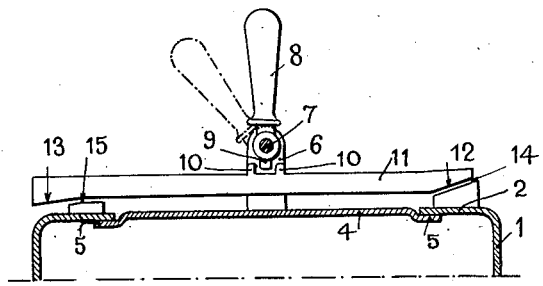
Fig. 4 is an axial section of the cover, showing a closing device.

The cover 4 is slightly rotated about its supporting handle 8, and it can thus be entirely placed in the interior of the vessel, and this displacement will not require any great vertical projection of the cover 4 in the interior of the vessel; the cover is then brought into the proper position, as determined by matching marks, and herein the inclined parts 12—13 of the bar 11 are brought respectively into coincidence with the contact surfaces 14—15 of the vessel. By bringing the handle 8 into the position shown in the dot-and-dash of Fig. 4 the cover 4 will thus be tightly held in place when in the closed position.

The vessel is opened by proceeding in the inverse manner, but it should be noted that herein the cover will never be brought into contact with the food or the like contained in the said vessel, so that the food will not be contaminated, and further, the person's hand grasping the cover will be protected from all steam issuing from the vessel, by the cover itself.

In the construction shown in Figs. 5 to 7, a forked bracket 17 17 is mounted at any suitable point on the cover 4 and preferably at its centre of gravity; said bracket may have a square cross-section and it is inserted through an aperture of like shape which is formed in a supporting bar 18 which is in contact by its curved ends with the respective edges of the vessel 2.

At the upper end of said bracket is mounted an axle 19 carrying an eccentric disc 20 provided with a handle 21 and making contact with a disc 22 which is guided by the said bracket and is disposed at the top of the bar 18.

Upon the vessel 2 and at the points of contact with the ends of said bar 18 are provided the stops 24 whereby the position of said bar upon the vessel will be exactly determined.

With the aforesaid arrangement by which the cover is placed in position, said cover being held at the proper distance from the supporting bar 18, I proceed by bringing the handle 21 into the vertical position and by maintaining the cover by the said handle 21, and can thus insert the said cover, in a practically horizontal position into the vessel, as specified in the main patent. Due to the unsymmetrical position of the top opening in the vessel, when the cover has been placed in the vessel, I am enabled to bring the cross-piece into the position shown in Fig. 6—which is exactly found by the said matching points— and can then lower the handle 21 into the position shown in the drawing, whereby the said cover will be strongly held in the closed position.

To open the vessel, I raise the handle 21 into the vertical position; the cover is now suspended from the cross-piece 18 and is removed from its surface of contact with the vessel. Due to the fact that the said parts are assembled together, the cover is prevented from falling into the food contained in the said vessel.

The supporting cross-piece 18 may consist of a solid iron bar, or as observed in Fig. 7 it may consist of a piece of U iron, curved at the ends.

The said controlling means may be replaced by like means comprising a lever, a link or other parts. The means employed for closing the cover 4 may be otherwise arranged, and the shape of the vessel 1 may vary according to circumstances.

The said vessel may be made of any size and of all suitable materials, and it may be manufactured by process such as pressing, casting or the like. I might provide chambers in the interior of the vessel, having any suitable arrangement in the direction of the length or of the height, according to the circumstances of use.

The said invention is applicable to the cooking of food with or without water, and it can be used in all cases in which pressure is employed to further the physical change of one or more substances by the action of heat. The closing arrangement can be utilized with all vessels for cooking food or for like uses, and it can be even employed for the closing of boilers, tanks or the like.

In the construction shown in Figs. 8 to 11, the cover consists for example of sheet metal of suitable shape, which when viewed in plan has an oval, elliptical or like shape optionally symmetrical; said cover is held in place by the supporting plate 25 which may consist of sufficiently strong sheet metal and has preferably a bulged form to increase the strength. A quick-acting screw 26 mounted on the cover traverses the plate 25 and upon its external parts disposed the nut 27 ending in a handle 28. A spring 29, which may be of the plat, coiled or other form, is placed between the cover 4 and the plate 25 and urges these two members apart.

A suitable abutment, not shown, is preferably employed to limit the unscrewing of the nut 27 so as to prevent all dropping of the cover 4; said abutment may be made removable, so that the apparatus may be taken apart when it is to be cleaned or repaired, or to replace the parts.

To place the said cover in position, the said nut and handle 27—28 are unscrewed so as to occupy the position shown in Fig. 10. The plate 25 is urged outwardly by its spring and is properly held apart from the cover 4; said cover is placed in the vessel in the usual manner, and when in the proper position—as shown by the said marks—the handle is turned about so as to bring down the nut and to place the plate 25 in proper contact with the main body of the vessel, in the position shown in Fig. 11, by compressing the spring 29. When in the closed position, the vessel will not require the use of the clamping pieces in common use, such as straps or the like, and it will thus have a more compact shape.

Since the edge of the plate 25 makes contact with the top part of the edge 30 of the opening in the vessel, upon whose lower face the edge of the cover 4 is applied this will increase the amount of the surface upon which the joint is made.

When the cooking operation has been finished, and the vessel has been cooled, if a suitable packing member has been placed between the edge of the plate 25 and the top of the edge 30, this prevents the loosening of said cover by atmospheric pressure, so that the food will be kept out of contact with the air; herein the usual accessories such as the whistle or the fusible plug must be mounted upon the main body of the vessel.

The said packing member under the plate 25 might be disposed in the line of contact between the edge 30 and the top of the cover 4, thus making a more reliable joint for the said cover against the internal pressure.

The said supporting plate may be provided with any suitable number of screws 26 which may be arranged in an adequate manner and may each be provided with suitable pressure devices. Such pressure devices may be controlled simultaneously, and for this purpose they may be connected with suitable operating means.

Upon the upper part of the vessel may be formed a sunken portion for the insertion of the edge of the said supporting plate, said portion or recess having the outline of the said plate, thus affording means for matching the parts, and in this manner the upper part of the vessel may be left entirely smooth.

The arrangements provided in this constructional form can be utilized with all the devices represented in Figs. 1 to 7 for the tight closing of vessels of all classes and of all sizes, such as boilers, tanks and the like, as well as for their accessory parts, for instance for the coupling of pipes upon tanks, for coupling pipes together, or for like purposes.

What I claim is:

1. A self closing vessel comprising a main body having its upper face pierced with an unsymmetrical aperture, located in an unsymmetrical position with reference to the axes of symmetry of said upper face, and a cover adapted to be placed in position and removed by sliding it and rotating it horizontally thereby preventing its contact with the food and providing more food containing space within the vessel.

2. A self closing vessel comprising a main body having its upper face pierced with an aperture, said aperture being unsymmetrical in form and in an unsymmetrical position with reference to the axes of symmetry of said upper face, and a horizontally slidable rotatable cover adapted to be placed in position and removed without contacting with the food and providing a greater food space in the vessel, said cover having an unsymmetrical form relative to its transverse axes whereby it may be readily inserted and removed.

3. A self closing vessel for cooking food or for other purposes, said vessel having a top plate with an opening therein, a self closing cover of a suitable size adapted for contact with the inner face of said plate adjacent the aperture to be closed when the cover is applied, said cover being provided with a rod having a central position, said rod having a plate thereon, a suitable closing nut, controlling handle connected with said nut and, an elastic device placed between said cover and plate whereby the said cover may be more readily placed in position and its general size reduced and the apparatus made fluid tight.

4. A self closing cooking vessel comprising a main body having an oval shaped cross section, the upper face of said body being pierced with an aperture having an unsymmetrical form and unsymmetrical position with reference to the axes of symmetry of said upper face, and a cover adapted to be placed in position and removed by sliding it and rotating it horizontally thus preventing its contact with the food.

5. A self closer for containers in which an unsymmetrical opening is unsymmetrically arranged with reference to the axes of symmetry of the container to be closed, thus allowing the cover of said opening to be placed in position and removed without having to incline said cover on the container thereby preventing the contamination of the substances contained in the container.

In testimony whereof I have hereunto set my hand at Paris, this 21st day of September, 1927.

MOÏSE ALI CHARLOT.